United States Patent
Udler

(10) Patent No.: US 7,761,842 B2
(45) Date of Patent: Jul. 20, 2010

(54) SYSTEM AND METHOD FOR GENERATING A GRAPHICAL USER INTERFACE (GUI) ELEMENT

(75) Inventor: Arthur Udler, Pittsburgh, PA (US)

(73) Assignee: Computer Associates Think, Inc., Islandia, NY (US)

( * ) Notice: Subject to any disclaimer, the term of this patent is extended or adjusted under 35 U.S.C. 154(b) by 859 days.

(21) Appl. No.: 10/887,764

(22) Filed: Jul. 9, 2004

(65) Prior Publication Data

US 2005/0010901 A1    Jan. 13, 2005

Related U.S. Application Data

(60) Provisional application No. 60/486,649, filed on Jul. 11, 2003.

(51) Int. Cl.
G06F 9/44 (2006.01)
G06F 3/00 (2006.01)
(52) U.S. Cl. .................. 717/106; 717/110; 715/762
(58) Field of Classification Search .................. 717/109
See application file for complete search history.

(56) References Cited

U.S. PATENT DOCUMENTS

| | | | |
|---|---|---|---|
| 5,335,320 A | 8/1994 | Iwata et al. | |
| 5,347,629 A | 9/1994 | Barrett et al. | 715/762 |
| 5,909,214 A | 6/1999 | Consolatti et al. | 715/764 |
| 5,940,075 A | 8/1999 | Mutschler, III et al. | 715/760 |
| 5,956,029 A | 9/1999 | Okada et al. | 715/746 |
| 5,974,430 A | 10/1999 | Mutschler, III et al. | 715/207 |
| 6,003,047 A | 12/1999 | Osmond et al. | 715/210 |
| 6,005,568 A | 12/1999 | Simonoff et al. | 715/744 |
| 6,115,040 A | 9/2000 | Bladow et al. | 715/741 |
| 6,157,936 A | 12/2000 | Mutschler, III et al. | 715/207 |
| 6,173,316 B1 | 1/2001 | De Boor et al. | 709/218 |
| 6,177,941 B1 | 1/2001 | Haynes et al. | 715/810 |
| 6,212,535 B1 | 4/2001 | Weikart et al. | 715/207 |
| 6,222,537 B1 * | 4/2001 | Smith et al. | 715/762 |
| 6,249,844 B1 | 6/2001 | Schloss et al. | 711/122 |
| 6,266,681 B1 * | 7/2001 | Guthrie | 715/501.1 |

(Continued)

FOREIGN PATENT DOCUMENTS

EP     0622729     11/1994

(Continued)

OTHER PUBLICATIONS

International Business Machines Corporation; "Multi-Modal Data Access"; Research Disclosure; Kenneth Mason Publications; Westbourne, GB; vol. 426, No. 114; Oct. 1999.

(Continued)

Primary Examiner—Michael J Yigdall
(74) Attorney, Agent, or Firm—Pillsbury Winthrop Shaw Pittman LLP

(57) ABSTRACT

In certain embodiments, a method for generating a graphical user interface (GUI) element comprises storing code for each of one or more types of GUI elements and receiving a request to generate a particular type of GUI element, the request comprising one or more parameters. The method further comprises accessing the code for the requested particular type of GUI element and automatically generating a GUI element package based on the code for the requested particular type of GUI element and the one or more parameters of the request.

34 Claims, 1 Drawing Sheet

U.S. PATENT DOCUMENTS

| | | | |
|---|---|---|---|
| 6,275,226 B1 | 8/2001 | Uchida et al. | 715/744 |
| 6,300,947 B1 | 10/2001 | Kanevsky | 345/333 |
| 6,323,884 B1 | 11/2001 | Bird et al. | |
| 6,342,907 B1 | 1/2002 | Petty et al. | 715/762 |
| 6,430,556 B1 | 8/2002 | Goldberg et al. | 707/4 |
| 6,456,307 B1 | 9/2002 | Bates et al. | 345/838 |
| 6,476,828 B1 | 11/2002 | Burkett et al. | 715/760 |
| 6,532,463 B1 | 3/2003 | Robbins et al. | 707/9 |
| 6,628,305 B1 | 9/2003 | Hong et al. | 715/734 |
| 6,701,383 B1 | 3/2004 | Wason et al. | 719/328 |
| 6,701,513 B1 | 3/2004 | Bailey | |
| 6,802,053 B1 | 10/2004 | Dye et al. | 717/113 |
| 6,961,750 B1* | 11/2005 | Burd et al. | 709/203 |
| 7,065,744 B2 | 6/2006 | Barker et al. | 717/109 |
| 7,069,553 B2 | 6/2006 | Narayanaswamy et al. | 717/173 |
| 7,124,398 B2 | 10/2006 | Chen et al. | 717/106 |
| 7,143,359 B2* | 11/2006 | Aggarwal et al. | 715/760 |
| 7,159,183 B1 | 1/2007 | Kudukoli et al. | 715/752 |
| 7,191,404 B2 | 3/2007 | Barker et al. | 715/760 |
| 7,216,298 B1 | 5/2007 | Ballard et al. | 715/760 |
| 7,219,305 B2 | 5/2007 | Jennings | 715/761 |
| 2001/0032220 A1 | 10/2001 | Ven Hoff | 707/513 |
| 2002/0049867 A1 | 4/2002 | Kumagai | 709/319 |
| 2002/0063734 A1 | 5/2002 | Khalfay et al. | 715/744 |
| 2002/0085020 A1 | 7/2002 | Carroll | 345/700 |
| 2002/0101448 A1 | 8/2002 | Sanderson | 345/762 |
| 2002/0109718 A1 | 8/2002 | Mansour et al. | |
| 2002/0149619 A1* | 10/2002 | Sauer | 345/762 |
| 2002/0152244 A1 | 10/2002 | Dean et al. | 707/530 |
| 2002/0188633 A1* | 12/2002 | Davis et al. | 707/513 |
| 2003/0025732 A1 | 2/2003 | Prichard | 715/765 |
| 2003/0160822 A1 | 8/2003 | Belz et al. | 345/762 |
| 2003/0193521 A1 | 10/2003 | Chen et al. | 715/762 |
| 2004/0001092 A1 | 1/2004 | Rothwein et al. | 345/763 |
| 2004/0021688 A1 | 2/2004 | Phillips | 345/762 |
| 2004/0061713 A1 | 4/2004 | Jennings | 345/700 |
| 2004/0168121 A1 | 8/2004 | Matz | 715/513 |
| 2004/0205571 A1 | 10/2004 | Adler et al. | 715/513 |
| 2005/0010877 A1 | 1/2005 | Udler | 715/826 |
| 2005/0044526 A1 | 2/2005 | Kooy | 717/106 |
| 2005/0262517 A1 | 11/2005 | French | 719/316 |
| 2006/0129982 A1 | 6/2006 | Doyle | 717/115 |

FOREIGN PATENT DOCUMENTS

| | | |
|---|---|---|
| WO | WO 00/29950 | 5/2000 |
| WO | WO 02/44897 | 6/2002 |

OTHER PUBLICATIONS

International Search Report dated May 27, 2005 issued in counterpart International Application No. PCT/US2004/021901; 7 pages.

International Search Report issued in International Application No. PCT/US2004/021969, Sep. 12, 2005, 7 pages.

Marc Abrams & Contantinos Phanouriou: "UIML: An XML Language for Building Device-Independent User Interfaces"; XML Conference Proceedings, Proceedings of XML; Dec. 1999; pp. 1-15.

Firoozye, R.; "A Cross-Platform Plug-In Toolkit—Creating Dynamically Extendable Applications"; *Dr. Dobbs Journal*; Redwood City, CA, USA; vol. 18, No. 6; Jun. 1993; pp. 120-134.

Anonymous; "Plug-In Guide"; 1998; pp. 1-32.

Anonymous; "Plug-In Guide, Chapter I—Plug-In Basics"; http://Developer.netscape.com/docs/manuals/communicator/plugindex.htm; Jan. 15, 1997; pp. 1-19.

Anonymous; "Introduction to a XUL Document"; Jun. 30, 1999.

PCT International Search Report issued in International Application No. PCT/US2004/021833; Jun. 17, 2005; 7 pages.

Object Technology International, "Eclipse Platform Technical Overview", Jul. 2001.

International Search Report issued in International Application No. PCT/US2005/017010; Sep. 2, 2005; 6 pages.

\* cited by examiner

SYSTEM AND METHOD FOR GENERATING A GRAPHICAL USER INTERFACE (GUI) ELEMENT

RELATED APPLICATION

This application claims the priority under 35 U.S.C.§119 of provisional application Ser. No. 60/486,649 filed Jul. 11, 2003.

TECHNICAL FIELD

This disclosure relates generally to the field of graphical user interfaces (GUI) and more specifically to a system and method for generating a GUI component.

BACKGROUND

A graphical user interface (GUI) is an important part of most software applications. In a web environment, users frequently view information or other data using a browser providing a GUI. For example, a user may access a website, one or more portals, one or more portlets, or any other suitable access point to view information or other data using a browser providing a GUI.

SUMMARY

The present disclosure provides a system and method for generating a graphical user interface element. In certain embodiments, a method for generating a graphical user interface (GUI) element comprises storing code for each of one or more types of GUI elements and receiving a request to generate a particular type of GUI element, the request comprising one or more parameters. The method further comprises accessing the code for the requested particular type of GUI element and automatically generating a GUI element package based on the code for the requested particular type of GUI element and the one or more parameters of the request. The details of one or more embodiments of the disclosure are set forth in the accompanying drawings and the description below. Particular features, objects, and advantages of the disclosure will be apparent from the description and drawings and from the claims.

DESCRIPTION OF EXAMPLE EMBODIMENTS

Figure 1:
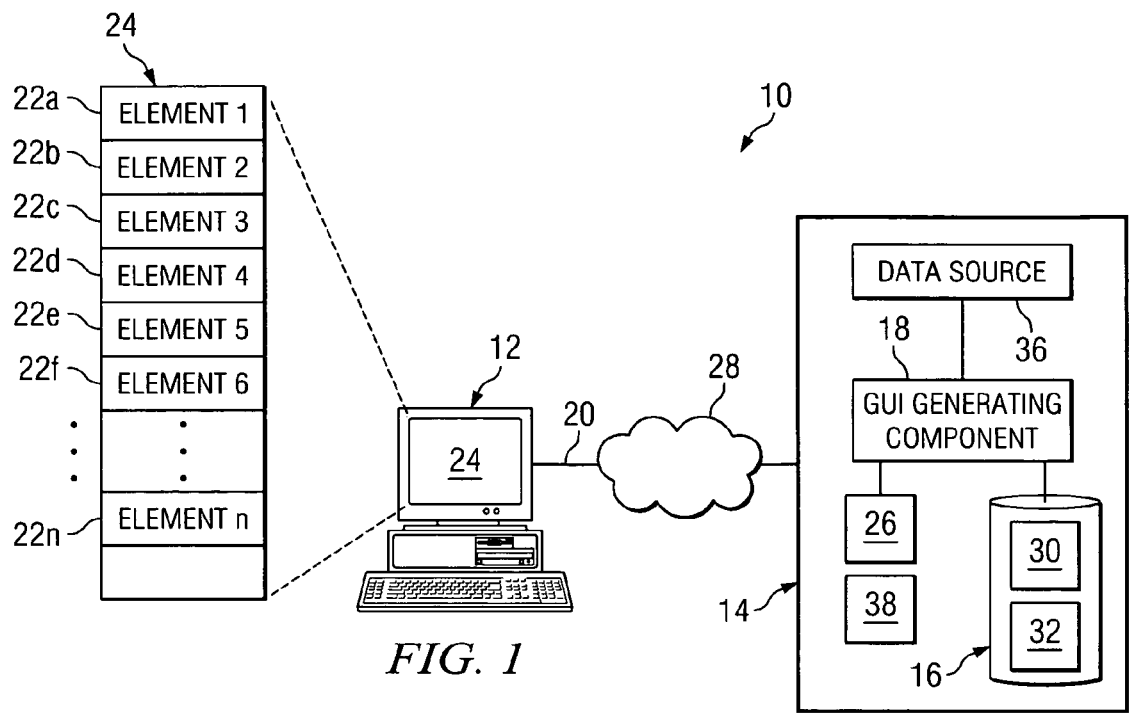
FIG. 1 illustrates an example system for generating one or more graphical user interface (GUI) elements.

FIG. 1 illustrates an example system 10 for generating one or more graphical user interface (GUI) elements. In certain embodiments, system 10 includes one or more user systems 12 and a server system 14. Although system 10 is illustrated as a client/server environment including one or more user systems 12 and server system 14, this is merely for example purposes and system 10 may include any suitable computing or networked environment. System 10 provides certain centralized features for generating one or more GUI elements and, in certain embodiments, allows for more efficient code generation as well as consistency in appearance and behavior of the GUIs generated. In general, system 10 enables generation of a GUI element according to one or more parameters. In certain embodiments, memory 16 stores code for each of one or more types of GUI elements. A GUI generating component 18 of server system 14 receives a request to generate a particular type of GUI element, the request including one or more parameters; accesses code for the requested particular type of GUI element; and automatically generates a GUI element package based on the code for the requested particular type of GUI element and the one or more parameters of the request.

Each user system 12 may submit one or more requests 20 to server system 14 to generate one or more GUI elements 22 for display on a GUI 24 of user system 12. For example, user system 12 may communicate request 20 via a hyperlink or other suitable message or request format. GUI elements 22 may include one or more text boxes, one or more dropdown boxes, one or more check boxes, one or more radio buttons, one or more titles, one or more text areas, one or more applets, grids, trees charts, or any other suitable GUI elements according to particular needs. In certain embodiments, GUI elements 22 comprise elements of a HyperText Markup Language (HTML) form that includes scripts, images, styles, and other displays. Although GUI elements 22 are referred to primarily as "elements," GUI elements 22 may include GUI fragments, GUI components, or any other suitable subdivisions of a GUI. Request 20 may include one or more parameters. In certain embodiments, the one or more parameters include a GUI descriptor identifying the type of GUI element 22 to be generated, a data source identifier, one or more data item identifiers, one or more display characteristics, scripting information, or any other suitable parameters.

Each user system 12 may include input devices, output devices, mass storage media, processors, memory, interfaces, communication ports, or other appropriate components for communicating requests 20 to server system 14 and viewing the generated GUI elements 22. Additionally, user system 12 may include a personal computer, workstation, network computer, kiosk, wireless data port, personal data assistant (PDA), one or more processors within these or other devices, or any other suitable processing device. Furthermore, although one user system 12 is illustrated, the present disclosure contemplates system 10 including any suitable number of user systems 12, according to particular needs. Moreover, "user system 12" and "user of user system 12" may be used interchangeably without departing from the scope of this disclosure. As an example, user system 12 may comprise a computer that includes an input device, such as a keypad, touch screen, mouse, or other device that can accept information, and an output device that conveys information associated with the operation of server system 14 or user systems 12, including digital data, visual information, or any other suitable information. Both the input device and output device may include fixed or removable storage media such as a magnetic computer disk, CD-ROM, or other suitable media to both receive input from and provide output to users of user systems 12 through GUI 24 of user systems 12.

GUI 24 may include a graphical user interface operable to allow a user of user system 12 to interface with server system 14 to receive and view data or other suitable information from server system 14 or other associated computer systems, including generated GUI elements 22. Generally, GUI 24 provides the user of user system 12 with an efficient and user-friendly presentation of data provided by server system 14. GUI 24 may include a plurality of displays having interactive fields, pull-down lists, and buttons operated by the user. In one example, GUI 24 presents various web-enabled data feeds and receives commands from user system 12. It should be understood that the phrase graphical user interface may used in the singular or in the plural to describe one or more graphical user interfaces and each of the displays of a particular graphical user interface. Furthermore, GUI 24 contemplates any graphical user interface, such as a generic web browser, that processes information in system 10 and efficiently presents the information to the user. Server system 14 may accept data from user system 12 via the web browser (e.g., MICROSOFT INTERNET EXPLORER™, NETSCAPE NAVIGATOR™, or any other suitable web browser) and return the appropriate HTML, extensible Markup Language (XML), or other suitable responses.

Server system 14 includes one or more electronic computing devices operable to receive, transmit, process and store data associated with system 10. For example, server system 14 may include one or more general-purpose personal computers (PCs), MACINTOSH™ computers, workstations, Unix-based computers, server computers, or any other suitable devices. In certain embodiments, server system 14 includes or is coupled with a web server. In short, server system 14 may include software and/or hardware in any combination suitable to present user system 12 with one or more GUI elements 22.

It will be understood that FIG. 1 merely provides one example of computers that may be used with the disclosure. For example, although FIG. 1 provides one example of server system 14 that may be used with the disclosure, system 10 may be implemented using computers other than servers, as well as a server pool. The present disclosure contemplates computers other than general purpose computers as well as computers without conventional operating systems. As used in this document, the term "computer" is intended to encompass a personal computer, workstation, network computer, or any other suitable processing device.

Server system 14 may include an interface 26 for communicating with other computer systems such as user systems 12 over a network 28 in a client-server or other distributed environment. Network 28 facilitates wireless or wireline communication between server system 14 and other computers. Network 28 may communicate, for example, Internet Protocol (IP) packets, Frame Relay frames, Asynchronous Transfer Mode (ATM) cells, voice, video, data, and other suitable information between network addresses. Network 28 may include one or more local area networks (LANs), radio access networks (RANs), metropolitan area networks (MANs), wide area networks (WANs), all or a portion of the global computer network known as the Internet, and/or any other communication system or systems at one or more locations. Generally, interface 26 comprises logic encoded in software and/or hardware in a suitable combination and operable to communicate with network 28. More specifically, interface 26 may comprise software supporting one or more communications protocols associated with communications network 28 or hardware operable to communicate physical signals.

Server system 14 includes memory 16 and processor 38. Although memory 16 is illustrated as being included in server system 14, the present disclosure contemplates memory 16 being local or remote to server system 14. For example, memory 16 may be coupled to network 28, and server system 14 may access memory 16 via network 28. Memory 16 may include any suitable fixed or removable storage media such as a local hard disk, a magnetic computer disk, CD-ROM, mass storage media, or other suitable media for storage of data. In certain embodiments, memory 16 includes or is coupled to a database or other suitable information server. Although only one memory 16 is shown, system 10 may include any suitable number and types of memories 16, according to particular needs. Memory 16 may include any hardware, software, firmware, or combination thereof operable to store and facilitate retrieval of information. Additionally, memory 16 may use any of a variety of data structures, arrangements, and compilations to store and facilitate retrieval of information.

Memory 16 may be operable to store code 30 for use in generating each of one or more types of GUI elements 22. Code 30 may be written in any suitable programming language, such as CU, C#, J*, J#, or VISUAL BASIC™, according to particular needs. As described above, GUI elements 22 may include one or more text boxes, one or more dropdown boxes, one or more checkboxes, one or more radio buttons, one or more titles, one or more text areas, one or more applets, grids, trees charts, or any other suitable GUI elements according to particular needs; In certain embodiments, code 30 may include code for generating a generic GUI element 22 (e.g., a generic text box or a generic applet). Memory 22 further stores or references one or more scripts 32 and other information for use by scripts 32. In certain embodiments, scripts 32 are associated with a corresponding GUI element 22 for which code 30 is stored. As just one example, scripts 32 may include XML scripts, although the present disclosure contemplates any suitable types of scripts 32. Scripts 32 may provide various functionality or serve any other suitable purpose. For example, a script 32 may hold one or more parameters for use with code 30.

Server system 14 may be associated with one or more data sources 36. In certain embodiments, data source 36 may include a third-party web server or an enterprise agent residing on a target machine, although the present invention contemplates any suitable data source 36 according to particular needs. It will be understood that the target machine may be remote or on-site; further, the target machine may represent a separate process running on server system 14 or user system 12 without departing from the scope of this disclosure. Generally, data source 36 receives requests from server system 14 and retrieves data from the software product residing on the target machine. Once the data has been gathered, data source 36 may communicate the data to server system 14 or server system 14 may retrieve the data from data source 36 as appropriate. The data associated with data source 36 may include any suitable data, according to particular needs. For example, the data may include data from a central security server.

Although data source 36 is illustrated as being included in server system 14, the present disclosure contemplates data source 36 being local or remote to server system 14. For example, data source 36 may be coupled to network 28 and server system 14 may access data source 36 via network 28. Additionally, although one data source 36 is illustrated, the present disclosure contemplates server system 14 including or being otherwise coupled to any suitable number and types of data sources 36. Furthermore, although data source 36 is illustrated as being separate from memory 16, in certain embodiments, data associated with data source 36 is stored as a part of memory 16 rather than as a separate component of system 10.

Server system 14 includes one or more processors 38. Processor 38 executes instructions and manipulates data to perform the operations of server system 14 such as, for example, a central processing unit (CPU), an application specific integrated circuit (ASIC), or a field-programmable gate array (FPGA). Although a single processor 38 is illustrated, server system 14 may include any suitable number of processors 38 according to particular needs.

Server system 14 may include GUI generating component 18, which may be used to generate one or more GUI element packages in response to user requests 20. In certain embodiments, GUI generating component 18 is implemented as a software component of server system 14, although the present invention contemplates GUI generating component 18 being implemented in any suitable combination of software, firmware, or hardware according to particular needs. In certain embodiments, GUI generating component 18 may be used as a software development tool or application program interface (API) for development of GUIs for web-based applications. Additionally, although GUI generating component 18 is illustrated as a single multi-tasked module, the features and functionality performed by GUI generating component 18 may be performed by multiple modules such as, for example, a data retrieval module, a transformation module, and a presentation engine. Moreover, GUI generating component 18 may be a child or sub-module of another application, not illustrated, without departing from the scope of the disclosure.

Server system 14 may invoke GUI generating component 18 in response to requests 20 from user systems 12, automatically, or at any suitable time. Server system 14 may invoke GUI generating component 18 each time a user system 12 communicates a request 20, after a user system 12 communicates a particular number of requests 20, or at any other suitable time. In certain embodiments, GUI generating component 18 is invoked one or more times during dynamic GUI generation for each GUI element that needs to be placed on GUI 24 of user system 12. In general, GUI generating component 18 receives a request 20 to generate a particular type of GUI element 22 (with request 20 including one or more parameters), accesses code 30 for the requested particular type of GUI element 22 in memory 16, and automatically generates a GUI element package based on certain code 30 associated with the particular type of GUI element 22 and the one or more parameters of the request 20. In certain embodiments, GUI generating component 18 communicates the GUI element package for generating the requested GUI element 22 to user system 12 for generation of the GUI element 22 at user system 12. For example, the GUI element package may include the accessed code 30 for the particular type of GUI element 22. The accessed code 30 in the GUI element package may be modified based on the one or more request parameters, prior to communicating the code 30 to user system 18 for example. Thus, in certain embodiments, the user requests a particular type of GUI element 22 and code for generating the a generic GUI element 22 (e.g., a generic text box) corresponding to the request may be accessed. GUI generating component 18 may then modify the accessed code 30 based on the one or more parameters of the request. In certain embodiments, these parameters may allow the user to customize the generic GUI element 22 according to the user's needs or desires.

In one aspect of operation of system 10, GUI generating component 18 receives a request 20 to generate a type of GUI element 22. In certain embodiments, server system 14 receives request 20 from a user system 12 comprising a GUI 24 for displaying a generated GUI element 22 and invokes GUI generating component 18 based, at least in part, receiving request 20. GUI generating component 18 may identify and access the corresponding code 30 for the requested type, of GUI element 22. For example, GUI generating component 18 may access memory 16 storing code 30 for each of one or more types of GUI elements 22. Request 20 may include one or more parameters. In certain embodiments, the one or more parameters include a GUI descriptor identifying the type of GUI element 22 to be generated, which may be used by GUI generating component 18 to identify and access the code 30 corresponding to the requested type of GUI element 22. The code 30 may include generic code for generating the requested type of GUI element 22. In these embodiments, GUI generating component 18 generates code 30 for the requested GUI element 22. In certain embodiments, GUI generating component 18 compiles the generated code 30 and communicates the GUI element 22 for display on user system 12. In other embodiments, GUI generating component 18 communicates the code 30 as GUI element package to user system 12 for compilation and display at user system 12. GUI generating component 18 may also modify the accessed code 30 based on the one or more parameters of request 20, as described below.

GUI generating component 18 may automatically generate the GUI element package based on one or more parameters of request 20. For example, GUI generating component 18 may modify code 30 for the requested type of GUI element 22 based on the one or more parameters of request 20 and communicate the modified code as a GUI element package; however, the present disclosure contemplates communicating code 30 for the requested type of GUI element 22 and the modifications associated with the one or more parameters of the request 20 to user system 12 in any suitable manner according to particular needs.

In certain embodiments, the one or more parameters may include a GUI descriptor identifying the type of GUI element 22 to be generated (e.g., which may be used to access the appropriate code 30 for the requested type of GUI element 22), one or more data source identifiers identifying one or more data sources 36, one or more data item identifiers identifying particular data within data source 36, one or more display characteristics, scripting information identifying one or more scripts 32, or any other suitable parameters. In an example embodiment in which the one or more parameters comprise one or more data source identifiers and one or more data item identifiers, GUI generating component 18 may initiate connection to the one or more data sources 36 identified by the data source identifiers to retrieve data associated with the one or more data item identifiers and populate the generated GUI element 22 with the retrieved data. As an example, generated GUI element 22 may be a table and the data may include statistical information or other data for populating the table. As another example, generated GUI element 22 may be a window container and the data may include a remote file structure associated with the user of user system 12. In certain embodiments, GUI generating component 18 may modify the accessed code 30 for the requested type of GUI element 22 such that when the modified code 30 is compiled, the resulting generated GUI element 22 is generated according to include the retrieved data. This modified code 30 may be communicated to user system 12 as the GUI element package.

In an embodiment in which the one or more parameters comprise one or more display characteristics, GUI generating component 18 may apply the one or more display characteristics to the GUI element 22 generated in response to request 20. For example, the display characteristics may include sizing information such as dimensions, color information such as background and foreground colors, location information, font type and size, or any other suitable information according to particular needs. In certain embodiments, GUI generating component 18 may modify the accessed code 30 for the requested type of GUI element 22 such that when the modified code is compiled, the resulting generated GUI element 22 is generated according to the one or more display characteristics of the request 20. This modified code may be communicated to user system 12 as the GUI element package.

In an embodiment in which the one or more parameters comprise scripting information identifying one or more scripts 32, GUI generating component 18 may initiate access to one or more scripts 32 identified by the scripting information and add the one or more accessed scripts 32 to the GUI element 22 generated in response to request 20. In certain embodiments, GUI generating component 18 may modify the accessed code 30 for the requested type of GUI element 22 such that when the modified code 30 is compiled, the resulting generated GUI element 22 is generated according to the one or more scripts 32 of the request 20. This modified code 30 may be communicated to user system 12 as the GUI element package.

GUI generating component 18 typically communicates the generated GUI element package to the user system 12 for display on GUI 24 (e.g., the browser) associated with user system 12. In certain embodiments, the generated GUI element package includes the accessed code 30 for the requested particular type of GUI element 22. In certain embodiments, code 30 of the GUI element package has been modified by GUI generating component 18 to based on the one or more parameters of request 20. In certain embodiments, the generated GUI element package may be communicated to user system 12 for compilation and generation at user system 12. For example, the generated GUI element package may be communicated to user system 12 in HTML format, however, the present invention contemplates communicating the GUI element package to user system 12 in any suitable manner according to particular needs. In certain embodiments, GUI generating component 18 adds the GUI element 22 generated in response to request 20 to an existing GUI 24 displayed on the browser of user system 12. For example, GUI generating component 18 may be operable to initiate placement of the generated GUI element 22 into complex layouts while allowing for controlled resizing.

While processing of one request 20 to display a GUI element 22 is described above, the present disclosure contemplates system 10 dynamically generating GUI elements 22 in response to a plurality of user requests 20 to generate any number of GUI elements 22. For example, a user of user system 12 may be in substantially continuous interaction with user system 12 and GUI 24 of user system 12 such that requests 20 are communicated to server system 14 substantially continuously. Additionally, in certain embodiments, generated GUI element packages may be stored for reuse in response to a request 20 from the same or a different user system 12, where this particular request 20 comprising the same one or more parameters used to generate the GUI element packages. In certain embodiments, GUI generating component 18 or another suitable component of server system 14 may receive new code 30 for one or more customized GUI elements 22 and store the new code 30 for the customized element 22, in memory 16 for example, the new code 30 being accessible to GUI generating component 18. Furthermore, GUI generating component 18 or another suitable component of server system 14 may receive new scripts, display characteristics, data sources identifiers, or other suitable information, and may store the new information, in memory 16 for example, the new information being accessible to GUI generating component 18.

In certain embodiment, the present disclosure may enable more efficient generation of GUI elements 22 and code 30 for GUI elements 22. The present disclosure may also help maintaining a similar or consistent appearance and behavior for GUI elements 22 generated using system 10. In certain embodiments, the present disclosure may reduce amount of work required to implement GUI elements 22, for example by reducing or eliminating the need to manually build and code each and every GUI element 22 to be displayed. Additionally, in certain embodiments, the present disclosure supports hierarchical presentation of information on user system 12. Furthermore, in certain embodiments, custom GUI elements 22 and advanced presentation options may be added to GUI 24, using GUI generating component 18 for example.

Figure 2:
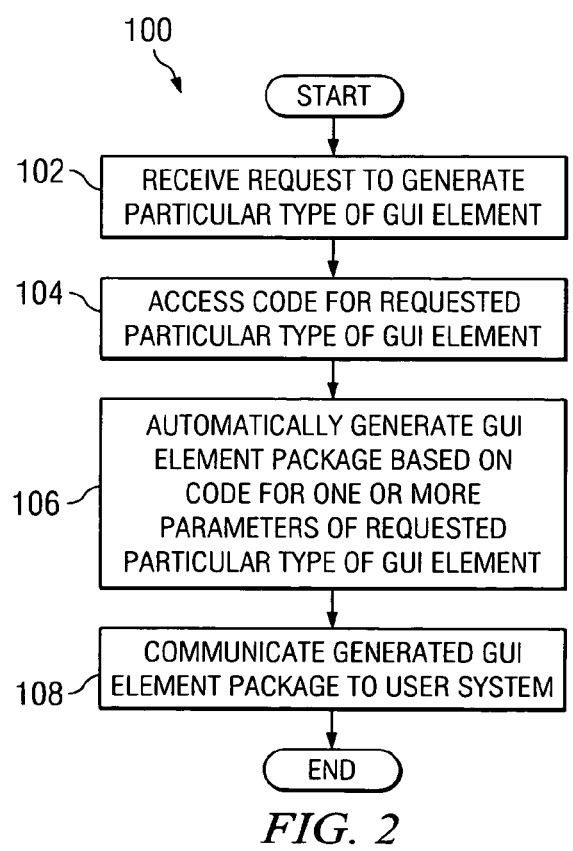
FIG. 2 illustrates an example method for generating a GUI element.

FIG. 2 illustrates an example method 100 for generating a GUI element 22. At step 102, GUI generating component 18 receives a request 20 to generate a GUI element 22. In certain embodiments, server system 14 receives request 20 from a user system 12 comprising a GUI 24 for displaying the generated GUI element 22 and server system 14 invokes GUI generating component 18 in response to request 20. Request 20 may include a requested type of GUI element 22. At step 104, GUI generating component 18 may access code 30 for the requested type of GUI element 22. For example, GUI generating component 18 may access memory 16 operable to store code 30 for each of one or more types of GUI elements 22. Request 20 may include one or more parameters. In certain embodiments, the one or more parameters include a GUI descriptor identifying the type of GUI element 22 to be generated. GUI generating component 18 may use the GUI descriptor to identify and access the corresponding code 30 for the requested type of GUI element 22.

At step 106, GUI generating component 18 may automatically generate a GUI element package based on the requested type of GUI element 22 and one or more parameters of request 20. For example, GUI generating component 18 may modify the accessed code 30 for the requested type of GUI element 22 based on the one or more parameters of the request. In certain embodiments, the one or more parameters may include a GUI descriptor identifying the type of GUI element 22 to be generated, one or more data source identifiers identifying one or more data sources 36, one or more data item identifiers identifying particular data within data source 36, one or more display characteristics, scripting information identifying one or more scripts 32, or any other suitable parameters. In an embodiment in which the one or more parameters comprise one or more data source identifiers and one or more data item identifiers, GUI generating component 18 may initiate connection to the one or more data sources 36 identified by the data source identifiers to retrieve data associated with the one or more data item identifiers and populate the generated GUI element 22 with the retrieved data. As an example, generated GUI element 22 may be a table and the data may include statistical information or other data for populating the table. In certain embodiments, GUI generating component 18 may modify the accessed code 30 for the requested type of GUI element 22 such that when the modified code 30 is compiled, the resulting generated GUI element 22 is generated according to include the retrieved data. This modified code 30 may be communicated to user system 12 as the GUI element package.

At step 108, GUI generating component 18 may initiate communication of the generated GUI element package to the user system 12 for display of GUI element 22 on GUI 24 (e.g., the browser) associated with user system 12. In certain embodiments, the generated GUI element package includes the accessed code 30 for the requested particular type of GUI element 22. In certain embodiments, the code 30 of the GUI element package has been modified by GUI generating component 18 to based on the one or more parameters of request 20. In certain embodiments, the generated GUI element package may be communicated to user system 12 for compilation and generation at user system 12. For example, the generated GUI element package may be communicated to user system 12 in HTML format, however, the present invention contemplates communicating the GUI element package to user system 12 in any suitable manner according to particular needs.

In certain embodiments, GUI generating component 18 adds the GUI element 22 generated in response to request 20 to an existing GUI 24 displayed on the browser of user system 12. For example, GUI generating component 18 may be operable to initiate placement of the generated GUI element 22 into complex layouts while allowing for controlled resizing. Although the present disclosure primarily describes an embodiment in which GUI generating component 18 initiates communication of the generated GUI element package to user system 12, the present disclosure contemplates the generated GUI element package being retrieved by user system 12 or otherwise delivered to user system 12, according to particular needs.

While processing of one request 20 to display a GUI element 22 is described above, the present disclosure contemplates system 10 dynamically generating GUI elements 22 in response to a plurality of user requests 20 to generate GUI elements 22. For example, a user of user system 12 may be in substantially continuous interaction with user system 12 and GUI 24 of user system 12 such that requests 20 are communicated to server system 14 substantially continuously. Additionally, in certain embodiments, generated GUI element packages may be stored for reuse in response to a request 20 from the same or a different user system 12, the request 20 comprising the same one or more parameters used to generate the GUI element packages. Further, GUI generating component 18 or another suitable component of server system 14 may receive new code 30 for a customized GUI element 22 and store the new code 30 for the customized element 22, in memory 16 for example, such that the new code 30 is subsequently accessible to GUI generating component 18.

Although a particular method 100 for generating a GUI element has been described with reference to FIG. 2, the present disclosure contemplates any suitable method for generating a GUI component in accordance with the present disclosure. Thus, certain of the steps described with reference to FIG. 2 may take place simultaneously and/or in different orders than as shown. Moreover, GUI generating component 18 may use methods with additional steps, fewer steps, and/or different steps, so long as the methods remain appropriate.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A system for developing a new graphical user interface (GUI) for use with a software application, comprising:
  a memory operable to pre-store:
    code for each of one or more types of GUI elements, wherein the pre-stored code includes code for generating a generic GUI element of each of the one or more types of GUI elements, and
    one or more scripts associated with at least one of the one or more types of GUI elements; and
  one or more processors configured by a GUI generating module to:
    receive a request from a GUI developer to generate a new customized GUI element package, the request comprising one or more parameters specified by the GUI developer, wherein the one or more parameters include a GUI element identifier for at least one type of GUI element, at least one display characteristic, and scripting information identifying at least one of the one or more scripts,
    access, from the memory, the pre-stored code for each type of GUI element of the one or more parameters and the at least one of the one or more scripts identified by the scripting information,
    automatically generate the new customized GUI element package comprising modified code, the modified code comprising the accessed pre-stored code modified based on the at least one display characteristic of the request and the at least one accessed script, and
    provide the new customized GUI element package for use with the software application, wherein when compiled and displayed, the GUI element package displays a customized GUI according to the at least one display characteristic and the at least one accessed script.

2. The system of claim 1, wherein the one or more parameters of the request further include a data source identifier and a data item identifier, the one or more processors further configured by the GUI generating module to:
  initiate a connection to a data source identified by the data source identifier to retrieve data associated with the data item identifier; and
  generate the new customized GUI element package based at least in part on the retrieved data, wherein when compiled and displayed, the GUI element package further displays a customized GUI according to the data associated with the data item identifier.

3. The system of claim 1, wherein each of the one or more scripts includes code for performing one or more functions related to the display of the customized GUI, and wherein
  display of the customized GUI according to the at least one accessed script includes executing the one or more functions of the code associated with the at least one accessed script.

4. The system of claim 1, wherein the request is received from a GUI developer system including a browser for displaying the customized GUI.

5. The system of claim 4, wherein:
  the GUI generating module is further operable to initiate communication of the new customized GUI element package to the GUI developer system for display on the browser.

6. The system of claim 5, wherein the generated new customized GUI element package is communicated to the GUI developer system in HyperText Markup Language (HTML) format.

7. The system of claim 4, wherein the GUI generating module is further operable to initiate the addition of the new customized GUI element package to code for an existing GUI to be displayed on the browser.

8. The system of claim 1, wherein:
  the GUI generating module is further operable to communicate the new customized GUI element package the GUI developer system for compiling and display on the browser.

9. The system of claim 1, wherein the GUI generating module is further operable to dynamically generate particular types of customized GUI elements in response to a plurality of GUI developer requests to generate particular types of customized GUI elements.

10. The system of claim 1, wherein the GUI generating module is further operable to store the generated new customized GUI element package for reuse in response to a request from the same or a different GUI developer, the request comprising the same one or more parameters.

11. The system of claim 1, wherein the GUI generating module is operable to:
receive code for generating a customized type of GUI element; and
store the code for the customized type of GUI element in the memory, the code being accessible to the GUI generating module.

12. A computer-implemented method for developing a new graphical user interface (GUI) for use by an end user with a software application, the method operating on one or more computing devices having one or more processors configured to perform operations comprising:
pre-storing code for each of one or more types of GUI elements in a memory, wherein the pre-stored code includes code for generating a generic GUI element of each of the one or more types of GUI elements;
pre-storing one or more scripts associated with at least one of the one or more types of GUI elements;
receiving a request from a GUI developer to generate a new customized GUI element package, the request comprising one or more parameters specified by the GUI developer, the one or more parameters including an identifier for at least one type of GUI element, at least one display characteristic, and scripting information identifying at least one of the one or more scripts;
accessing, from the memory, the pre-stored code for each type of GUI element of the one or more parameters and the at least one of the one or more scripts identified by the scripting information;
automatically generating the new customized GUI element package comprising modified code, the modified code comprising the accessed pre-stored code modified based on the at least one display characteristic of the request and the at least one accessed script; and
provide the new customized GUI element package for use with the software application, wherein when compiled and displayed, the GUI element package displays a customized GUI according to the at least one display characteristic and the at least one accessed script.

13. The method of claim 12, wherein the one or more parameters of the request further include a data source identifier and a data item identified and the operations further comprising:
initiating a connection to a data source identified by the data source identifier to retrieve data associated with the data item identifier; and
generating the new customized GUI element package based at least in part on the retrieved data, wherein when compiled and displayed, the GUI element package further displays a customized GUI according to the data associated with the data item identifier.

14. The method of claim 12, wherein each of the one or more scripts includes code for performing one or more functions related to the display of the customized GUI, and wherein display of the customized GUI according to the at least one accessed script includes executing the one or more functions of the code associated with the at least one accessed script.

15. The method of claim 12, further comprising receiving the request from a GUI developer system including a browser for displaying the customized GUI.

16. The method of claim 15, the operations further comprising initiating communication of the new customized GUI element package to the user system for display on the browser.

17. The method of claim 16, further comprising communicating the generated new customized GUI element package to the GUI developer system in HyperText Markup Language (HTML) format.

18. The method of claim 15, further comprising initiating the addition of the new customized GUI element package to code for an existing GUI to be displayed on the browser.

19. The method of claim 12, the operations further comprising initiating communication of the new customized GUI element package the GUI developer system for compiling and display on the browser.

20. The method of claim 12, further comprising dynamically generating particular types of customized GUI elements in response to a plurality of GUI developer requests to generate particular types of customized GUI elements.

21. The method of claim 12, further comprising storing the generated new customized GUI element package for reuse in response to a request from the same or a different GUI developer, the request comprising the same one or more parameters.

22. The method of claim 12, further comprising:
receiving code for generating a customized type of GUI element; and
storing the code for the customized type of GUI element in the memory.

23. Software for developing a new graphical user interface (GUI) for use by an end user with a software application, the software being embodied in computer-readable media and when executed operable to:
pre-store code for each of one or more types of GUI elements in a memory, wherein the pre-stored code includes code for generating a generic GUI element of each of the one or more types of GUI elements;
pre-storing one or more scripts associated with at least one of the one or more types of GUI elements;
receive a request from a GUI developer to generate a new customized GUI element package, the request comprising one or more parameters specified by the GUI developer, wherein the one or more parameters include a GUI element identifier for at least one type of GUI element, at least one display characteristic, and scripting information identifying at least one of the one or more scripts;
access, from the memory, the pre-stored code for each type of GUI element of the one or more parameters and the at least one of the one or more scripts identified by the scripting information;
automatically generate the new customized GUI element package comprising modified code, the modified code comprising the accessed pre-stored code modified based on the at least one display characteristic of the request and the at least one accessed script; and
provide the new customized GUI element package for use with the software application, wherein when compiled and displayed, the GUI element package displays a customized GUI according to the at least one display characteristic and the at least one accessed script.

24. The software of claim 23, the one or more parameters of the request further include a data source identifier and a data item identifier and wherein the software is further operable to:
initiate a connection to a data source identified by the data source identifier to retrieve data associated with the data item identifier; and
generate the new customized GUI element package based at least in part on the retrieved data, wherein when compiled and displayed, the GUI element package further displays a customized GUI according to the data associated with the data item identifier.

25. The software of claim 23, wherein each of the one or more scripts includes code for performing one or more functions related to the display of the customized GUI, and wherein display of the customized GUI according to the at least one accessed script includes executing the one or more functions of the code associated with the at least one accessed script.

26. The software of claim 23, wherein the software is further operable to receive the request from a GUI developer system including a browser for displaying the customized GUI.

27. The software of claim 26, wherein the software is further operable to initiate communication of the new customized GUI element package to the GUI developer system for display on the browser.

28. The software of claim 27, wherein the software is further operable to communicate the generated new customized GUI element package to the GUI developer system in HyperText Markup Language (HTML) format.

29. The software of claim 26, wherein the software is further operable to initiate the addition of the new customized GUI element package to code for an existing GUI to be displayed on the browser.

30. The software of claim 23, wherein the software is further operable to initiate communication of the new customized GUI element package the GUI developer system for compiling and display on the browser.

31. The software of claim 23, wherein the software is further operable to dynamically generate particular types of new customized GUI elements in response to a plurality of GUI developer requests to generate particular types of customized GUI elements.

32. The software of claim 23, wherein the software is further operable to store the generated new customized GUI element package for reuse in response to a request from the same or a different GUI developer system, the request comprising the same one or more parameters.

33. The software of claim 23, wherein the software is further operable to:
  receive code for generating a customized type of GUI element; and
  store the code for the customized type of GUI element in the memory.

34. A system for developing a new graphical user interface (GUI) for use by an end user with a software application, comprising:
  a memory that stores:
    code for each of one or more types of GUI elements, wherein the stored code includes code for generating a generic GUI element of each of the one or more types of GUI elements; and
  one or more processing devices configured to:
    receive a request from a GUI developer to generate a new customized GUI element package, the request comprising one or more parameters specified by the GUI developer, wherein the one or more parameters include a GUI element identifier for at least one type of GUI element, at least one display characteristic, and one or more of:
      scripting information identifying at least one of the one or more scripts, or
      data item information including a data item identifier accompanied by a data source identifier, and
    access, from the memory, the pre-stored code for each type of GUI element of the one or more parameters,
    access the at least one of the one or more scripts identified by the scripting information when the one or more parameters include scripting information,
    initiate a connection to a data source identified by the data source identifier to retrieve data associated with the data item identifier when the one or more parameters include data item information,
    generate the new customized GUI element package comprising modified code, the modified code comprising accessed the pre-stored code modified according to the at least one display characteristic of the request, any script identified by scripting information, and any retrieved data, and
    provide the new customized GUI element package for use with the software application, wherein when compiled and displayed, the GUI element package displays a customized GUI according to the at least one display characteristic, any script identified by scripting information, and any retrieved data.

\* \* \* \* \*